Nov. 1, 1966 O. FAGIOLI ET AL 3,282,082

APPARATUS FOR MOLECULAR WEIGHT DETERMINATION

Filed Dec. 26, 1963

*INVENTORS*

OLIVIERO FAGIOLI

ANGELO DE ROS 3,282,082
Patented Nov. 1, 1966

3,282,082

APPARATUS FOR MOLECULAR WEIGHT DETERMINATION

Oliviero Fagioli, Florence, and Angelo De Ros, Milan-Greco, Italy, assignors to Lepetit S.p.A., Milan, Italy Filed Dec. 26, 1963, Ser. No. 333,608
Claims priority, application Italy, Jan. 11, 1963, 625/63
4 Claims. (Cl. 73—15)

This invention relates to a method for the determination of molecular weights and to an apparatus which may be used for such determination.

An apparatus for use in molecular weight determination according to the invention comprises (1) a plurality of open cells and associated means for maintaining all the cells at an equal and constant temperature, (2) one or more removable covers for these cells and (3) devices for adjusting the temperature of the cover or covers uniformly.

A method for the determination of the molecular weight of a substance according to the invention comprises arranging a plurality of cells each having an open end and all at the same temperature, partly filling one cell with a solution of known concentration of a substance whose molecular weight is to be determined in a solvent, partly filling each of the remaining cells with solutions in the said solvent having known molarities chosen such that the molarity of the solution of the substance of unknown molecular weight lies within the range of molarities of the solution of known molarity, maintaining the temperature of the cells constant, cooling a removable cover for all the cells or for each cell uniformly to below the temperature of the cells, and timing the disappearance of condensation on the cover surface on uniform reheating of said cover, and then calculating the value of the molecular weight which is to be determined by interpolation.

In a preferred form of apparatus according to the invention a plurality of cells, preferably 6 in number, are recessed in the top surface of a metal block which has devices for heating it to a temperature slightly above room temperature. Preferably the block is covered with a single ground glass plate which is coextensive with the block as the cover for the cells.

Preferably, the means for cooling the cover comprises a metal disc coextensive with or larger than the cover which may be cooled and then placed upon the cover in order to reduce the temperature of the cover while the temperature of the solutions in the cells remains constant. As result of the cooling of the cover condensation of the solvent of the solutions in the cells occurs on the underside of the cover. On removal of the metal disc the temperature of the glass cover gradually increases and at a temperature which is dependent upon the molarity of the solution the condensate evaporates from the surface. Likewise, the temperature at which the condensate originally formed on the cover, in each cell is dependent upon the molarity of the solution in the cell. For practical reasons it is preferred that observations should be made on the time of disappearance of the condensate in each cell.

The time of the disappearance of condensate in each cell is recorded and a graph is preferably then plotted of these times against the molarities of the solutions. By interpolation the molarity of the solution of unknown molecular weight can be calculated and hence, knowing the concentration of the solution of the compound of unknown molecular weight, the molecular weight can be calculated.

It is essential for the operation of the method according to the invention that the molarity of the solution under test should lie within the range of the molarities of the solutions being used as standard solutions. If an approximate value for the molarity of the solution under test is not known then it is necessary to carry out one or more preliminary tests to determine this approximate value. Conveniently, the approximate value of the molarity can be determined by carrying out the process of the invention by employing three standard solutions covering a wide range of molarities, for example 0.20, 0.10 and 0.05, and three solutions of differing concentrations of the substance of unknown molecular weight. If it is found that the condensate in one of the cells containing the test solution does not evaporate at a time between the time of evaporation of the first and last condensates in the cells containing known solutions then it is necessary to repeat the procedure with different molarities until the molarity of one of the test solutions is eventually embraced within the range of the molarities of the known solutions.

Solvents which may be used in the method according to the invention include water, methanol, ethanol, butanol, methylacetate, ethylacetate, acetone, carbon disulphide, chloroform and benzene and the substances used for the preparation of solutions of known molarity in such solvents include urea, methylurea, tartaric acid, glucose, benzyl, benzoic acid, p-nitrobenzaldehyde, azobenzene, benzophenone and phenanthrene. Such substances and solvents must of course be analytically pure.

It will be apparent from the foregoing that the method of molecular weight determination described is dependent upon the observation of the dewpoint of the solution in each cell.

When the surface in the open end of the cell and the cell are at the same temperature then the solvent cannot condense out from the vapour because its vapour pressure is greater than the vapour pressure of the solution. The solvent can be present in equilibrium with the solution only when the temperature of the surface is such that the vapour pressure of the solvent is equal to that of the solution. At such an equilibrium, the solvent is on the point of condensing on the surface in the open end of the cell. This critical temperature depends upon the molarity of the solution, and so on gradually cooling the surfaces in the cells this equilibrium condition is passed through in each cell in chronological sequence in accordance with the molarity of the various solutions.

Although the method and apparatus of the invention involves maintaining several bodies of solutions at a time allowing films of condensates of the solvents to evaporate, which requires absorption of heat, the quantity of condensates needed for visibility are extremely small, and so although heat of condensation will be used up on evaporation errors due to this can be rendered almost negligible by keeping the quantity of condensate as small as possible. It is found that a thickness of condensate of a few wave-lengths of light in the visible range is all that is necessary for observation and the condensates of this thickness have a heat of condensation such that the errors involved due to the heat of condensation are very small. For instance, the thermal capacity of a glass disc weighing about 80 grams is approximately 15–20 cal./° C.; with the most unfavourable solvent water, the quantity of condensate on 6 discs each of 2-cm. diameter and each having a thickness of $0.5\mu$ or less is 1.25 mg. and the heat exchanged in the distillation is not greater than 0.75 cal.

It is preferable that the cover be in good contact with the block so that a hermetic closure is provided between the block and the cover so that the temperature distribution over the cover during the change in temperature of the glass is such that the temperature changes regularly from the outer circumference of the cell inwards. Thus, on initial cooling of the cover uniform circular haloes of condensate will form on the cover, each having the diameter of the cell in which they are formed. On gradual heating the halo of condensate gradually and regularly decreases in diameter and finally disappears. It is preferred to measure the instant of final disappearance in each case. The cooling of the cover must be carefully controlled as over cooling leads to the formation of drops while if cooling is poor condensation may not occur at all.

The difference in temperature between the cells and the cover may conveniently be measured by a system of thin differential thermocouples which are connected to any indicating instrument via a chopper amplifier and a lock-in detector, such a system readily indicating temperature changes of the order of 0.05° C.

The measurement of molecular weight by the method according to the invention is particularly useful as only very small quantities of the test substance need to be used and the solutions of the substance undergo no chemical or physical changes during the determination and so can be used for further tests or the substance can be recovered unchanged from the solvent.

On the accompanying drawing there is shown by way of example an apparatus constructed in accordance with the invention. In said drawing, FIG. 1 is a central vertical section, with parts in elevation;

FIG. 2 is a central section taken at a right angle to that of FIG. 1; while

Figure 2:
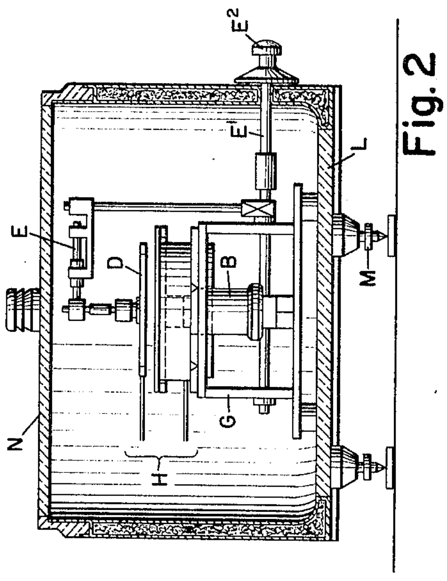

Referring to the drawing, a typical apparatus according to the invention comprises a cell block in the form of a cylinder A of copper electrically plated with platinum and 10 centimeters in diameter and 3 centimeters high, into the top surface of which six cylindrical cells A' have been bored each 2 centimeters in diameter and one centimeter in depth, the cells being bored at the corners of a regular hexagon with the centre of each cell 3.2 centimeters away from the axis of the block. Screwed to the undersurface of the block is a heater B formed by a copper cylinder containing a ceramic support with a nickel chrome wire having a resistance of about eighty ohms. The required power is about 1 watt. The heater supply comprises a 12-volt A.C. transformer and a graduated rheostat. Over the cell block is a glass disc C of a slightly greater diameter than the cell block, about 12 centimeters, and having a uniform thickness of 0.23 centimeter. The bottom surface of the glass disc has previously been carefully ground with corundum whose grain size was 3$\mu$. A cooling disc D comprising an aluminium disc 10 centimeters in diameter and 0.5 centimeter thick is connected to one end of an arm E, the other end of which is pivoted to some suitable support, the connection of the cooling disc to the end of the arm being such that the cooling disc is always horizontal. The pivot for the support comprises a horizontal spindle E' which is rotatable by a knob $E^2$ and there may be an adjustable friction brake so as to smooth the movement of the cooling disc to ensure that the glass disc is not moved when the cooling disc is placed on it or lifted away from it. When lifted away from the glass disc the cooling disc F conveniently rests on a second aluminium disc having a diameter of 12 centimeters and a thickness of 0.5 centimeter and a surface such that there is good thermal contact with the cooling disc when this rests on it. Usually the cell block rests on some suitable box, for example a Plexiglas box, in which the spindle is mounted and on which is fixed the second aluminium disc.

Cotton covered constantan wire 0.3 millimeter in diameter and a cotton covered copper wire 0.2 millimeter in diameter form a thermocouple H which is secured to the cooling disc so as to enable measurement of the temperature difference between this disc and the cell block. This thermocouple gives an E.M.F. of about 38 $\mu$v./° C. and has a resistance of 4–5 ohms.

The whole of the apparatus described above may conveniently be enclosed within a cylindrical polythene vessel K which is thermally insulated and which is contained on a cylindrical aluminium vessel L mounted on 3 adjusting screws M so that the apparatus may be adjusted to a level position. Convenient internal dimensions for the polythene vessel are: diameter 32 centimeters and depth 21 centimeters. The vessel is closed by a transparent Plexiglas cover N. Through the side of the vessel protrudes the knob with which the spindle is rotated so as to move the cooling disc. Above the Plexiglas cover a fluorescent lamp may be mounted in order to facilitate the observation of the haloes on the ground glass screen.

The E.M.F. of the thermocouple is amplified for observation by a driftless D.C. amplifier formed by a chopper vibrating at 50 cps., a transistored A.C. amplifier, and a lock-in detector operated by the chopper. The output is indicated on a centre reading micrometer with two scale ranges of 0.5 and 2° C.

In a preferred method according to the invention using apparatus of the type described above, 5 solutions of one of the standard substances listed above in one of the solvents listed above are prepared having the following molarities: 0.20, 0.17, 0.14, 0.11 and 0.08. Two milliliters of each of one of these solutions are introduced into one each of the five cells and then a solution of known concentration of the substance of unknown molecular weight is introduced into the sixth cell. A ground glass disc is then placed on the block to cover the cells, this disc having been previously cleaned by washing with a detergent in water, immersion in chromic acid mixture, washing with distilled water and then drying in a dust free atmosphere. Three small symmetrical areas of silicone grease are put on the outer circumference of the surface of the block to avoid shifting of the glass disc when the cooling disc is removed. The block is then heated electrically slowly to the desired temperature. It is found that the value for the temperature difference ($\Delta$T) between the temperature of the block and room temperature which results in the best measurement depends mainly on the boiling point of the solvent (B.P.). The following formula has been empirically found to give suitable values for $\Delta$T for solvents boiling in the range of 40 to 120° C. and for room temperatures of between 18 and 25° C: $\Delta T=0.0147$ (P.B.−0.347).

The cooling disc is then carefully placed on the glass disc and after fifteen seconds it is raised and removed from the glass disc. Condensation haloes of the solvent appear on the glass at the top of each cell and as the temperature of the glass disc gradually returns to the temperature of the block these haloes gradually disappear. The times at which these haloes do disappear is conveniently measured from the time at which the first halo disappears, this being the halo in the cell of the solution of highest molarity. If $\Delta$T has been appropriately chosen the maximum disappearance time, that is, the time taken for the halo in the cell of lowest molarity to disappear, is from 3 to 15 minutes for most solvents although for solvents of high boiling point, such as water and butanol, this time may be as much as 40 minutes. It may be found advantageous to assist observation of the haloes by providing some appropriate form of lighting by placing a lamp outside the vessel. Reflections of light can be prevented by placing a black screen on the glass vessel cover.

Figure 4:
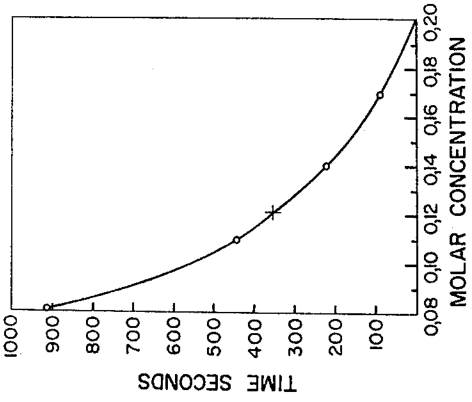
Figure 1:
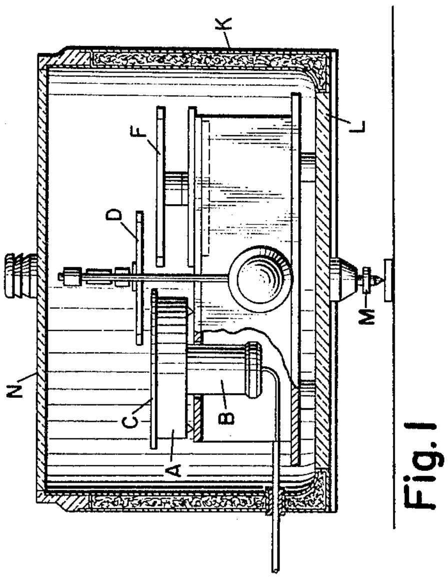
Figure 3:
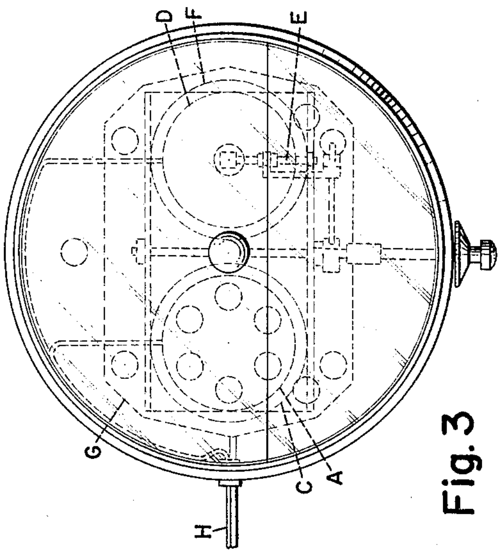
FIG. 3 is a top plan view of the apparatus.

A graph is then plotted of molarity against disappearance time and by interpolation, knowing the disappearance time, the molarity of the solution of the compound of unknown molecular weight can be calculated. The graph obtained is a monotone curve. The accompanying FIGURE 4 shows the graph obtained in an experiment to determine the molecular weight of benzophenone using ethyl alcohol as the solvent and urea as the standard substance. Readings for the time taken for the disappearance of each halo after the disappearance of the halo corresponding to the solution of highest molarity against the molarity are plotted and are indicated by a cross, and the molarity to be ascertained is measured from the graph by interpolation. It is usually advisable to repeat the experiment about five times so as to minimize the errors.

Typical detailed results for the determination of the molecular weight of a substance dissolved in methyl alcohol at two different molarities are given in Table I, the standard reference substance used being urea.

TABLE I

| Substance | Molarity | | Molarity | |
|---|---|---|---|---|
| | Theor. | Found | Theor. | Found |
| Benzoic acid | 0.150 | 0.1490<br>0.1475<br>0.1485<br>0.1485<br>0.1475 | 0.120 | 0.1195<br>0.1215<br>0.1210<br>0.1200<br>0.1215 |
| | | Mean 0.1482<br>St. error 0.0010 | | Mean 0.1207<br>St. error 0.0007 |
| Mol. wt., 122.12. | | Mol. wt. calcd. 123.60 | | Mol. wt. calcd. 121.41 |

The results obtained for the determination of the molecular weight of various substances in different solvents are given in Table II.

TABLE II

| Solvent | Standard substance | Solute | Theoretical molecular weight | Molecular weight found | Error, percent |
|---|---|---|---|---|---|
| Methyl alcohol | Urea | p-Nitrobenzaldehyde | 151.12 | 151.3 | +0.13 |
| | | Benzophenone | 182.21 | 180.4 | −1.0 |
| Ethyl alcohol | do | Methyl urea | 74.04 | 74.92 | +1.2 |
| | | Tartaric acid | 150.9 | 149.5 | −0.4 |
| | | Benzophenone | 182.21 | 183.4 | +0.1 |

We claim:

1. Apparatus for use in molecular weight determination, comprising means providing a plurality of cells, open at the top, one of the cells being adapted to receive a solution, in a liquid solvent, of a known concentration of a test substance whose molecular weight is to be determined, while the other cells are adapted to receive solutions, in the same solvent, of different molarities of a known compound, means for simultaneously and uniformly heating the contents of all of the cells, transparent cover means covering the tops of the cells, and means for simultaneously and uniformly cooling the cover means to cause condensation of vapor of the solvent upon the underside of the cover means over all of the cells, whereby upon removal of the cooling means and gradual rise of temperature of the cover means, the visible condensate films will disappear in a succession depending upon the molar concentrations in the solutions both of the known substance and of the test substance whose molecular weight is to be determined, whereby the time intervals for the disappearance of the dew from the cells containing the known and the unknown test substances provide data from which the molecular weight of the test substance can be calculated.

2. Apparatus according to claim 1, wherein the cells are provided by bores in a metal block, said block being equipped with heating means for heating the contents of the cells all to the same temperature, the cover means consisting of a single transparent disc covering all the cells, the cooling means comprising a cooling disc movable into contact with the cover disc so as to cover the whole face of the latter.

3. Apparatus according to claim 2, wherein the block is in the form of a metal cylinder having a plurality of cylindrical cells bored in its top, the heater means being fitted to the base of the cylinder and carried on a frame, the transparent disc being of ground glass resting on the metal cylinder, a metal supporting disc resting on the frame, a cooling disc, an arm pivoted on the frame and carrying the cooling disc in horizontal position, said cooling disc being movable into position with its underface in contact either with the glass disc or with the supporting disc, the glass disc and cooling disc both having a diameter at least sufficient to cover all the cells.

4. Apparatus according to claim 3, wherein the cylinder is of platinated copper, the copper cylinder being provided at its lower extremity with a heater with electrical resistances threadedly inserted therein, the cooling disc and its supporting disc being of aluminium, and a constantan wire and a copper wire connected to the cooling disc and to the metal block for measuring the temperature difference between the cooling disc and the cell block.

References Cited by the Examiner

UNITED STATES PATENTS 1,680,638 8/1928 Rowan ---------- 73—15

RICHARD C. QUEISSER, *Primary Examiner.*

JACK C. GOLDSTEIN, *Assistant Examiner.*